(12) United States Patent
Vandenameele-Lepla

(10) Patent No.: US 7,170,961 B2
(45) Date of Patent: Jan. 30, 2007

(54) METHOD AND APPARATUS FOR FREQUENCY-DOMAIN TRACKING OF RESIDUAL FREQUENCY AND CHANNEL ESTIMATION OFFSETS

(76) Inventor: Patrick Vandenameele-Lepla, Baanakkerweg 3, 3060 Bertem (BE)

( * ) Notice: Subject to any disclaimer, the term of this patent is extended or adjusted under 35 U.S.C. 154(b) by 763 days.

(21) Appl. No.: 10/042,780

(22) Filed: Jan. 8, 2002

(65) Prior Publication Data

US 2003/0128751 A1 Jul. 10, 2003

(51) Int. Cl.
*H04L 7/00* (2006.01)
*H04L 25/40* (2006.01)
*H03D 3/24* (2006.01)
*H04B 7/14* (2006.01)
*H04B 7/165* (2006.01)

(52) U.S. Cl. ............ 375/371; 375/260; 375/229; 375/226; 455/17; 455/23; 455/702

(58) Field of Classification Search .......... 342/13; 375/371; 370/210
See application file for complete search history.

(56) References Cited

U.S. PATENT DOCUMENTS

| | | | |
|---|---|---|---|
| 5,228,062 A | | 7/1993 | Bingham |
| 5,282,222 A | | 1/1994 | Fattouche et al. |
| 5,450,456 A | | 9/1995 | Mueller |
| 5,487,069 A | | 1/1996 | O'Sullivan et al. |
| 6,442,211 B1 | * | 8/2002 | Hampel et al. ............ 375/260 |
| 6,628,738 B1 | * | 9/2003 | Peeters et al. ............ 375/371 |
| 6,704,374 B1 | * | 3/2004 | Belotserkovsky et al. .. 375/326 |
| 6,862,262 B1 | * | 3/2005 | Imamura .................. 370/210 |
| 2003/0086504 A1 | * | 5/2003 | Magee et al. ............. 375/262 |
| 2003/0112902 A1 | * | 6/2003 | Ghosh et al. ............. 375/347 |

FOREIGN PATENT DOCUMENTS

EP 1172956 A1 * 1/2002

OTHER PUBLICATIONS

"dspGuru: Invinite Impulse Response Filter FAQ", Loweigan International, 1999-2004, pags 1-2.*
Beek et al., "ML Estimation of Time and Frequency Offset in OFDM Systems," *IEEE Trans. on Signal Processing*, vol. 45, No. 7, pp. 1800-1805, (Jul. 1997).
Boelcskei, "Blind estimation of symbol Timing and Carrier Frequency Offset in Pulse Shaping OFDM Systems," *Proc. of IEEE Int. Conf. on Acoustics, Speech and Signal Processing*, pp. 2749-2752, Phoenix, AZ, (Mar. 1999).

(Continued)

*Primary Examiner*—Kevin Kim
*Assistant Examiner*—Linda Wong
(74) *Attorney, Agent, or Firm*—Withrow & Terranova, PLLC

(57) ABSTRACT

Various methods and apparatus for frequency-domain estimation of carrier frequency offsets are provided in which the carrier frequency offset estimate is robust against non-white (frequency-dependent) noise. A carrier-specific weighting factor is associated with each carrier of a multi-carrier signal. Using the carrier-specific weighting factors, a carrier frequency offset estimate is computed from received signals and estimated channel transfer functions associated with each of the carriers. Because greater weights are given to carriers whose frequencies include lower noise and/or carriers transmitting a known sequence of symbols, the estimate of the carrier frequency offset is improved. The carrier frequency offset estimate may then be applied in a feedback loop to phase-compensate a subsequently received signal.

29 Claims, 6 Drawing Sheets

OTHER PUBLICATIONS

Chang et al., "A New Estimation Scheme For Frequency and Timing Offsets in OFDM Systems," *Proc. of the IEEE Vehicular Technology Conference*, pp. 1832-1835, Boston, MA, (Sep. 2000).

Classen et al., "Frequency Synchronization Algorithms for OFDM Systems suitable for Communication over Frequency-Selective Fading Channels," *Proc. of The IEEE Vehicular Technology Conference*, pp. 1655-1659, Stockholm, Sweden, (Jun. 1994).

Gunther et al., "A New Approach for Symbol Frame Synchronization and Carrier Frequency Estimation in OFDM Communications," *Proc. of The IEEE Int. Conf. on Acoustics, Speech and Signal Processing*, pp. 2725-2728, Phoenix, AZ, (Mar. 1999).

Hwang et al., "Frequency and Timing Period Offset Estimation Technique for OFDM Systems," *Electronics Letters*, vol. 34, No. 6, pp. 520-521, (Mar. 19, 1998).

Jin et al., "The Estimation of Time Delay and Doppler Stretch of Wideband Signals," *IEEE Trans. on Signal Processing*, vol. 43, No. 4, pp. 904-916, (Apr. 1995).

Kang et al., "Decision-directed maximum likelihood estimation of OFDM frame synchronization offset," *Electronics Letters*, vol. 30, No. 25, pp. 2153-2154, (Dec. 8, 1994).

Lambrette et al., "OFDM Burst Frequency Synchronization by Single Carrier Training Data," *IEEE Communications Letters*, vol. 1, No. 2, pp. 46-48, (Mar. 1997).

Lim et al., "An Efficient Carrier Frequency Offset Estimation Scheme for an OFDM System," *Proc. of the IEEE Vehicular Technology Conference*, pp. 2453-2457, Boston, MA, (Sep. 2000).

Luise et al., "Carrier Frequency Acquisition and Tracking for OFDM Systems," *IEEE Trans. on Communications*, vol. 44 No. 11, pp. 1590-1598, (Nov. 1996).

Moose et al., "A Technique for Orthogonal Frequency Division Multiplexing Frequency Offset Correction," *IEEE Trans. on Communications*, vol. 42 No. 10, pp. 2908-2914, (Oct. 1994).

Pollet et al., "Synchronization with DMT Modulation," *IEEE Communications Magazine*, pp. 80-86, (Apr. 1999).

Rinne et al., "An Equalization Method for Orthogonal Frequency Division Multiplexing Systems in Channels with Multipath Propagation, Frequency Offset and Phase Noise," *IEEE*, pp. 1442-1446, (1996).

Schmidl et al., "Blind synchronisaation for OFDM," *Electronics Letters*, vol. 33, No. 2, pp. 113-114, (Jan. 16, 1997).

Simoens et al., "A New Method for Joint Cancellation of Clock and Carrier Frequency Offsets in OFDM receivers over Frequency Selective Channels," *2000 IEEE 51$^{st}$ Vehicular Technology Conference Proceedings*, pp. 390-394, Tokyo, Japan, (May 2000).

Tureli et al., "Blind Carrier Synchronization and Channel Identification for OFDM Communications," *Proc. of IEEE Int. Conf. on Acoustics, Speech and Signal Processing*, pp. 3509-3512, Seattle, WA, (May 1998).

Visser et al., "A Novel Method for Blind Frequency Offset Correction in an OFDM System," *Proc. of the IEEE PIMRC*, pp. 816-820, Boston, MA, (Sep. 1998).

Wei et al., "Synchronization Requirement for Multi-user OFDM on Satellite Mobile and Two-path Rayleigh Fading Channels," *IEEE Trans. on Communications*, vol. 43, No. 2, pp. 887-895, (Feb. 1995).

\* cited by examiner

METHOD AND APPARATUS FOR FREQUENCY-DOMAIN TRACKING OF RESIDUAL FREQUENCY AND CHANNEL ESTIMATION OFFSETS

CROSS-REFERENCES TO RELATED APPLICATIONS

This application relates to commonly assigned co-pending U.S. patent application Ser. No. 09/966,419, filed Sep. 27, 2001, titled "Method and Apparatus for Channel Estimation," by Patrick Vandenameele-Lepla, the disclosure of which is hereby incorporated by reference in its entirety for all purposes.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates in general to communication systems, and in particular to methods and systems for improving various aspects of communication systems utilizing multi-carrier transmission techniques such as orthogonal frequency division multiplexing.

Wireless personal communication devices have proliferated over the past several years. Integration of more functionality such as multimedia capabilities into these devices has created an ever increasing demand for enhanced broadband communication methodologies. Unlike satellite communication where there is a single direct path from a transmitter to a receiver, personal wireless communication devices must operate in a multi-path environment. Multi-path propagation is caused by the transmitted signal reflecting off of objects such as buildings, automobiles, trees, etc., that may be encountered along the signal path. This results in the receiver receiving multiple copies of the transmitted signal each having different delay, attenuation and phase shift depending on the length of the path and the material composition of the objects along the path. The interference between the multiple versions of the transmitted signal, referred to as inter-symbol interference (ISI), is a common problem that can severely distort the received signal.

Orthogonal frequency division multiplexing (OFDM) is one type of multi-carrier data transmission technique that has had some success in addressing ISI, distortion and other problems associated with multi-path environments. OFDM divides the available spectrum into multiple carriers, each one being modulated by a low rate data stream. Multiple user access is achieved by subdividing the available bandwidth into multiple channels, that are then allocated to users. The orthogonality of the carriers refers to the fact that each carrier has an integer number of cycles over a symbol period. Due to this, the spectrum of each carrier has a zero at the center frequency of each of the other carriers in the system. This results in no interference between the carriers, allowing them to be spaced as close as theoretically possible.

Each carrier in an OFDM signal has a very narrow bandwidth, thus the resulting symbol rate is low. This results in the signal having a high tolerance to multi-path delay spread, as the delay spread must be very long to cause significant inter-symbol interference. Coded orthogonal frequency division multiplexing (COFDM) is the same as OFDM except that forward error correction is applied to the signal before transmission. This is to overcome errors in the transmission due to lost carriers from frequency selective fading, channel noise and other propagation effects. In the description presented herein, the terms OFDM and COFDM are used interchangeably.

In OFDM the sub-carrier pulse used for transmission is chosen to be rectangular. This allows the task of pulse forming and modulation to be performed by an inverse discrete Fourier transform (IDFT). IDFT is implemented very efficiently as an inverse fast Fourier transform (IFFT) which would then require only an FFT at the receiver end to reverse the process. In order to accurately reproduce the transmitted signal, the receiver must estimate and compensate for various distortions in the received signal, including channel transfer function, carrier frequency offset and clock frequency offset.

The channel transfer function reflects the effect of the propagation channel on a transmitted signal, including multipath delay effects. A number of techniques are known for estimating and compensating for the channel. Channel estimation may be performed in the receiver either in the time domain (i.e., before the receiver performs the FFT on the received signal) or in the frequency domain (i.e., after the receiver performs the FFT on the received signal). Compensation for the channel using the channel estimate is generally performed in the frequency domain.

Carrier frequency offset (CFO) arises from the finite tolerance of RF components used in the transmitter and receiver. Even though the transmitter frequency is usually known to the receiver, due to RF tolerance, the frequency at which the receiver operates may not match exactly. This offset causes a phase shift in the received signal. Additionally, in systems where the transmitter or receiver is mobile, Doppler effects may also give rise to carrier frequency offsets. In order to provide accurate reproduction of the transmitted signal, this CFO-induced phase shift must be estimated and compensated by the receiver.

Clock frequency offset (CLO) arises from a mismatch between the sampling rate at the receiver and the sampling rate at the transmitter; again, the mismatch causes a phase shift in the received signal that must be estimated and compensated by the receiver. In addition, CLO may cause synchronization errors if the receiver assigns too many or too few samples to a symbol. Some OFDM standards, such as the 802.11a standard, reduce the complexity of the clock and carrier frequency offset problem by requiring that the carrier frequency and clock frequency in the receiver be derived from the same oscillator. But these standards do not eliminate the problem since the frequency of the receiver's oscillator will in general not exactly match the frequency of a transmitter's oscillator.

A number of methods for estimating phase shifts caused by CFO and/or CLO have been proposed. Some of these methods operate on received signals in the time domain (i.e., before the FFT is performed by the receiver); these include computations based on time correlations. Others operate in the frequency domain (i.e., after the FFT is performed by the receiver) and may involve least squares or maximum likelihood computations.

Existing methods for estimating phase shifts assume that the only noise present is additive white Gaussian noise, i.e., that the noise power spectrum is independent of carrier frequency. In many implementations of OFDM, however, non-white noise (i.e., noise with a power spectrum that depends on frequency, such as 1/f noise) may be present due to the receiver front end electronics or other noise sources. This non-white noise adversely affects the existing phase estimation methods, leading to increased error rates. Thus, a need exists for a method of computing carrier frequency and clock frequency offsets that does not rely on the assumption of white noise.

BRIEF SUMMARY OF THE INVENTION

The present invention provides methods and systems for efficiently implementing broadband multi-carrier communication systems. In one embodiment, the invention provides a frequency-domain estimate of carrier frequency offsets that is robust against non-white (frequency-dependent) noise. Specifically, a carrier-specific weighting factor is associated with each of the carriers of a multi-carrier signal. A set of received signals and estimated channel transfer functions associated with each of the carriers are then used together with the carrier-specific weighting factors to compute a carrier frequency offset. This carrier frequency offset estimate may then be applied in a feedback loop to phase-compensate a subsequently received signal. Because greater weights are given to carriers whose frequencies include lower noise and/or carriers transmitting a known sequence of symbols, the estimate of the carrier frequency offset is improved, resulting in more reliable reproduction of a transmitted multi-carrier signal by a receiver. Additionally, in embodiments where the multi-carrier communication system conforms to certain standards, the carrier frequency offset estimate may be used to compute a clock frequency offset estimate. The clock frequency offset estimate may then be used to accomplish further improvement of signal synchronization. These and other advantages flow from the methods and systems of the present invention.

According to one aspect of the present invention, in a multi-carrier data communication system, a method of estimating a carrier frequency offset for a received signal is provided. The method comprises associating each of a plurality of carrier-specific weighting factors with a different one of a plurality of carriers of the multi-carrier data and assigning a value to each of the plurality of carrier-specific weighting factors, the value being related to a noise power associated with the associated carrier. A carrier frequency offset estimate is then computed using the received signal, an estimate of a channel transfer function associated with the received signal, and the plurality of carrier-specific weighting factors. This carrier frequency offset estimate may then be used to phase compensate a subsequent received signal.

The values of the carrier-specific weighting factors may be assigned by measuring a noise power spectrum across the plurality of carriers, then selecting a value inversely proportional to the noise power for one of the plurality of carriers and assigning the selected value to the associated carrier-specific weighting factor. Further, in embodiments where the plurality of carriers includes a first subset of pilot carriers, which carry a known sequence of symbols, and a second subset of non-pilot carriers, a first carrier-specific weighting factor associated with one of the pilot carriers may be increased relative to a second carrier-specific weighting factor associated with one of the non-pilot carriers. Still further, in embodiments where a first carrier has an associated channel estimate that has higher reliability than a channel estimate associated with a second carrier, a first carrier-specific weighting factor associated with the first carrier may be increased relative to a second carrier-specific weighting factor associated with the second carrier.

The carrier frequency offset estimate may be computed by phase-compensating the received signal using a previous carrier frequency offset estimate; equalizing the phase-compensated signal using the estimate of the channel transfer function; computing a phase metric from the phase-compensated signal, the equalized signal, the estimate of the channel transfer function, and the plurality of carrier-specific weighting factors; computing a phase of the phase metric; and applying a loop filter to the computed phase. The phase metric may be computed by applying a threshold cutoff to the equalized signal, thereby producing a sliced signal; multiplying the phase-compensated signal for each of the plurality of carriers by the complex conjugate of the sliced signal for the carrier and by the complex conjugate of the channel estimate for the carrier, thereby obtaining a first product; multiplying the first product by the carrier-specific weight associated with the carrier, thereby obtaining a weighted product; and summing the weighted product over the plurality of carriers, thereby obtaining the phase metric.

According to another aspect of the invention, a method for processing a multi-carrier signal transmitted across a channel is provided. A value is assigned to each of a plurality of carrier-specific weighting factors, each of the plurality of carrier-specific weighting factors being associated with a different one of a plurality of carriers of the multi-carrier signal, and the assigned value of each carrier-specific weighting factor being related to a noise power associated with the carrier. The multi-carrier signal is received and phase-compensated using a phase compensation factor, then equalized using a channel estimate. A carrier frequency offset is estimated using the phase-compensated signal, the equalized signal, the channel estimate, and the plurality of carrier-specific weighting factors. A clock frequency offset is estimated using the estimated carrier frequency offset. The phase compensation factor is updated using the estimated carrier frequency offset and the estimated clock frequency offset.

The carrier frequency offset may be estimated by computing a phase metric from the phase-compensated signal, the equalized signal, the channel estimate, and the plurality of carrier-specific weighting factors; computing a phase of the phase metric; and applying a loop filter to the computed phase. The loop filter may comprise an infinite impulse response filter. The phase metric may be computed by applying a threshold cutoff to the equalized signal, thereby producing a sliced signal; multiplying the phase-compensated signal for each of the plurality of carriers by the complex conjugate of the sliced signal for the carrier and by the complex conjugate of the channel estimate for the carrier, thereby obtaining a first product; multiplying the first product by the carrier-specific weight associated with the carrier, thereby obtaining a weighted product; and summing the weighted product over the plurality of carriers, thereby obtaining the phase metric. The clock frequency offset may be computed by multiplying the estimated carrier frequency offset by a factor inversely proportional to a carrier frequency.

According to yet another aspect of the invention, the clock frequency offset estimate may be used to provide improved synchronization of the received signal. A net time offset may be computed based on the clock offset estimate and an elapsed time. A drop instruction may be generated when the net time offset exceeds a drop threshold, the drop instruction causing a portion of the multi-carrier signal to be dropped from a symbol, and an add instruction may be generated when the net time offset is below an add threshold, the add instruction causing a portion of the multi-carrier signal to be added to the symbol. The elapsed time may be reset after the portion of the multi-carrier signal has been added to or dropped from the symbol.

According to a further aspect of the invention, a coarse carrier frequency offset and a fine carrier frequency offset may be determined. The phase compensation factor may be updated using the coarse carrier frequency offset and the fine carrier frequency offset.

According to a still further aspect of the invention, in a multi-carrier data communication system, a method of equalizing a multi-carrier signal is provided. The method includes estimating a channel transfer function; compensating a received signal using a phase compensation factor, yielding a phase-compensated signal; compensating the phase-compensated signal using the estimated channel transfer function, yielding an equalized signal; estimating a phase metric using the phase-compensated signal the equalized signal, the estimated channel transfer function, and a plurality of carrier-specific weighting factors, wherein each of the carrier-specific weighting factors being associated with a different one of a plurality of carriers of the multi-carrier signal and assigned a value related to a noise power associated with the carrier; estimating a carrier frequency offset using the estimated phase metric; estimating a clock frequency offset using the updated estimate of the carrier frequency offset; and updating the phase compensation factor using the estimated carrier frequency offset and the estimated clock frequency offset. The value of each of the carrier-specific weighting factors may be inversely proportional to a noise power associated with the associated carrier. Where the plurality of carriers comprises a first subset of pilot carriers and a second subset of non-pilot carriers, the carrier-specific weighting factor associated with at least one of the pilot carriers may be increased relative to the carrier-specific weighting factor associated with at least one of the non-pilot carriers.

A phase metric may be estimated by applying a threshold cutoff to the equalized signal, thereby producing a sliced signal; multiplying the phase-compensated signal for each carrier by the complex conjugate of the sliced signal for the carrier and by the complex conjugate of the estimated channel transfer function for the carrier, thereby obtaining a product; multiplying the product by the carrier-specific weight associated with the carrier, thereby obtaining a weighted product; and summing the weighted product over the plurality of carriers, thereby obtaining the phase metric.

The carrier frequency offset may be estimated by computing a phase metric from the phase-compensated signal, the equalized signal, the channel estimate, and the plurality of carrier-specific weighting factors; computing a phase of the phase metric; and applying a loop filter to the computed phase. The clock offset may be estimated by multiplying the estimated carrier frequency offset by a factor inversely proportional to the carrier frequency.

According to another aspect of the invention, in a receiver for a multi-carrier data communication system, an equalizer is provided. The equalizer comprises a phase compensator configured to receive the input sample, a carrier frequency phase offset estimate, and a clock frequency phase offset estimate, and to output a phase compensated sample; a channel equalization block configured to receive a plurality of channel estimates and the phase compensated sample, and to output an equalized data sample; a carrier frequency offset estimator configured to receive the plurality of channel estimates, the phase compensated sample, and the equalized sample, and to compute and output the carrier frequency phase offset estimate using a plurality of carrier-specific weighting factors, each of the carrier-specific weighting factors being associated with a different one of a plurality of carriers of the multi-carrier data and having a value related to a noise power associated with the associated carrier; and a clock frequency offset estimator configured to receive the carrier frequency phase offset estimate and compute the clock frequency phase offset estimate.

The carrier frequency offset estimator may comprise a weight source configured to output the plurality of carrier-specific weighting factors; a slicer configured to receive the equalized signal and to output a sliced signal; a phase metric updater configured to receive the plurality of channel estimates, the phase-compensated signal, the sliced signal, and the plurality of carrier-dependent weights, and to compute and output a phase metric; a phase computation unit coupled to the phase metric updater and configured to compute and output a phase of the phase metric; and a loop filter coupled to the phase computation unit and configured to store a plurality of values of the phase and to compute the carrier frequency phase offset estimate. The weight source may comprise a noise estimator configured to measure a noise power spectrum.

According to yet another aspect of the invention, a multi-carrier data communication system is provided. The system comprises a transmitter and a receiver. The transmitter includes a demodulator/deserializer configured to convert an input data stream into a parallel plurality of multi-carrier signals; a frequency-domain to time-domain converter having an input coupled to the modulator/deserializer and configured to transform the parallel plurality of multi-carrier signals from frequency domain into time domain at an output; a guard period insertion block coupled to the frequency-domain to time-domain converter and configured to insert a guard period in the output of the frequency-domain to time-domain converter; a serializer coupled to an output of the guard period insertion block and configured to perform a parallel to serial conversion on the signal; and a digital-to-analog converter coupled to the serializer and configured to convert the digital signal into an analog signal and to transmit the analog multi-carrier time domain signal across a channel. The receiver includes an analog-to-digital converter coupled to receive the analog signal and configured to convert the analog signal into a digital signal; a deserializer coupled to the analog-to-digital converter and configured to convert the digital signal into a plurality of parallel signals; a channel estimator coupled to an output of the deserializer and configured to compute a channel transfer function estimate; a guard period removal block coupled to an output of the channel estimator and configured to remove the guard period; a time-domain to frequency-domain converter coupled to an output of the guard period removal block; an equalizer coupled to an output of the time-domain to frequency-domain converter, configured to equalize the signal using the channel estimates and further configured to compensate for a carrier frequency offset and a clock offset using a carrier frequency offset estimate that includes a plurality of carrier-specific weighting factors, each of the carrier-specific weighting factors being associated with a different one of a plurality of carriers of the multi-carrier data and having a value related to a noise power associated with the associated carrier; and a serializer/demodulator coupled to the output of the equalizer and configured to generate an output data stream.

The multi-carrier data communication system may also include a preliminary carrier frequency offset estimation block coupled between the deserializer and the guard period removal block, the preliminary carrier frequency offset estimation block configured to output a preliminary estimate of carrier frequency offset. The equalizer may be configured to receive the preliminary estimate of carrier frequency offset for use in compensating for the carrier frequency offset.

The following detailed description along with the accompanying drawings will provide a better understanding of the nature and advantages of the present invention.

DETAILED DESCRIPTION OF THE INVENTION

Figure 1:
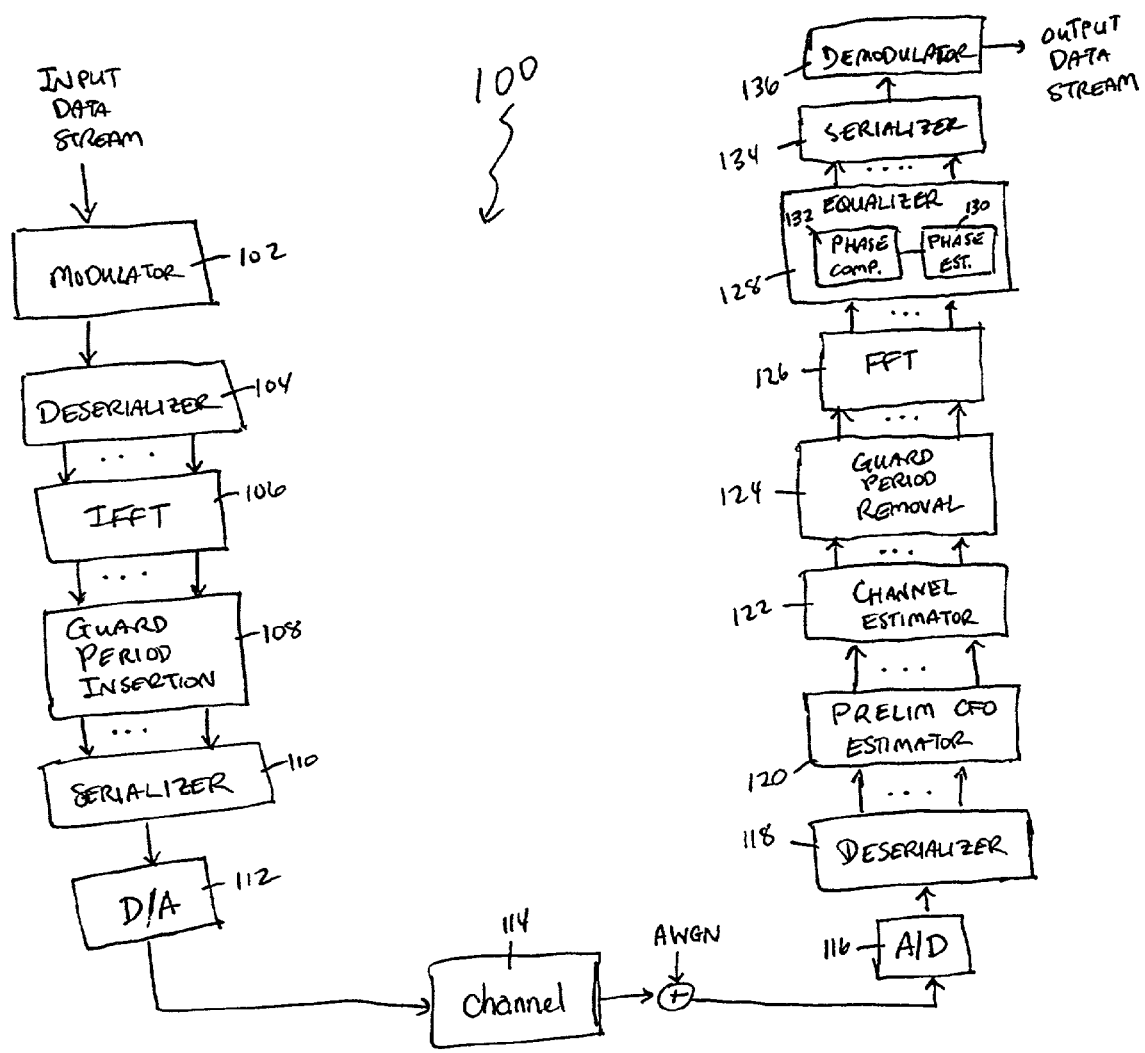
FIG. 1 is a block diagram of an OFDM system within which an exemplary embodiment of the present invention is implemented.

In one embodiment, the present invention provides an estimate of carrier frequency offset and clock frequency offset that is robust against the presence of non-white noise. Referring to FIG. 1, there is shown a simplified block diagram of a communication system 100 implementing OFDM according to an exemplary embodiment of the present invention. A modulator 102 first converts an input data stream comprising a number of symbols into a multi-amplitude multi-phase modulated signal. A deserializer (or serial-to-parallel converter) 104 converts the modulated signal into multiple sub-carriers X1 to Xn. An IFFT block 106 transforms the frequency domain signals X1–Xn into time domain signals x1 to xn. To preserve orthogonality between the carriers and to minimize ISI caused by multi-path signals, a guard period is inserted by block 108 between transmitted symbols. The guard period allows time for multi-path signals from the previous symbol to die away before the information from the current symbol is gathered. In this embodiment a cyclic extension of the symbol is used as the guard period. By replicating the end of the symbol waveform at the start of the symbol as the guard period, the orthogonality of the OFDM waveform is maintained, even in multi-path channel environments. The cyclic extended symbol is serialized by a serializer 110 and then converted into an analog signal by a digital-to-analog (D/A) converter 112, and transmitted over a channel 114. Channel 114 is a multi-path channel with additive white Gaussian noise (AWGN).

At the receiver end, an analog-to-digital (A/D) converter 116 receives the analog signal and converts it into a digital signal. The digital time-domain signal is first deserialized by a deserializer 118. Optionally, a preliminary estimation of and compensation for carrier frequency offset (CFO) is performed by a preliminary CFO estimator 120. A number of techniques for estimating carrier frequency offset in the time domain are known in the art and may be applied in preliminary CFO estimator 120. When preliminary CFO estimator 120 is used, a preliminary CFO estimate may be provided to downstream components.

The signal is then fed into a channel estimator 122, which computes channel estimates, for instance by processing a training sequence that is embedded in the data stream at the transmitter end. One embodiment of a channel estimator 122 that can be advantageously employed in communication system 100 is described in detail in the above-cross-referenced co-pending U.S. patent application Ser. No. 09/966, 419, titled "Method and Apparatus for Channel Estimation." Other channel estimators may also be used. The channel estimates are provided as an output for later use by downstream components, either by adding the channel estimates back into the data stream or by providing a separate data path (not shown). In either case, the data stream from channel estimator 122 is applied to a block 124 which determines the beginning of each symbol and removes the guard period from the time-domain signal. With the guard period removed, an FFT block 126 transforms the time-domain signal into a frequency domain signal.

An equalizer 128 receives the output of FFT block 126 and generates an equalized output signal. Equalizer 128 includes a phase estimator 130 and a phase compensator 132. Phase estimator 130 produces estimates of the carrier frequency offset and clock frequency offset, taking into account frequency-dependent (non-white) noise in the system, as will be described further below. Phase compensator 132 uses phase estimates provided by phase estimator 130 to compensate the received signal. Equalizer 128 also performs channel equalization on the signal using the channel estimates received from channel estimator 122. The equalized signal is then serialized by a serializer 134 and demodulated by a block 136 to generate an output data stream.

It is to be understood that the data communication system as depicted in FIG. 1 is for illustrative purposes only and that depending on the implementation it may include fewer or additional functional blocks, and that many variations are possible. For example, the order in which some of the blocks appear in the transmitter or receiver may vary depending on the implementation. As just one case, it is known in the art that channel estimation may be accomplished in the frequency domain rather than in the time domain; accordingly, in some implementations channel estimation may take place after transformation of the time-domain signal to the frequency domain. In some implementations the serial-to-parallel conversion may take place after the modulation in the transmitter.

Figure 2:
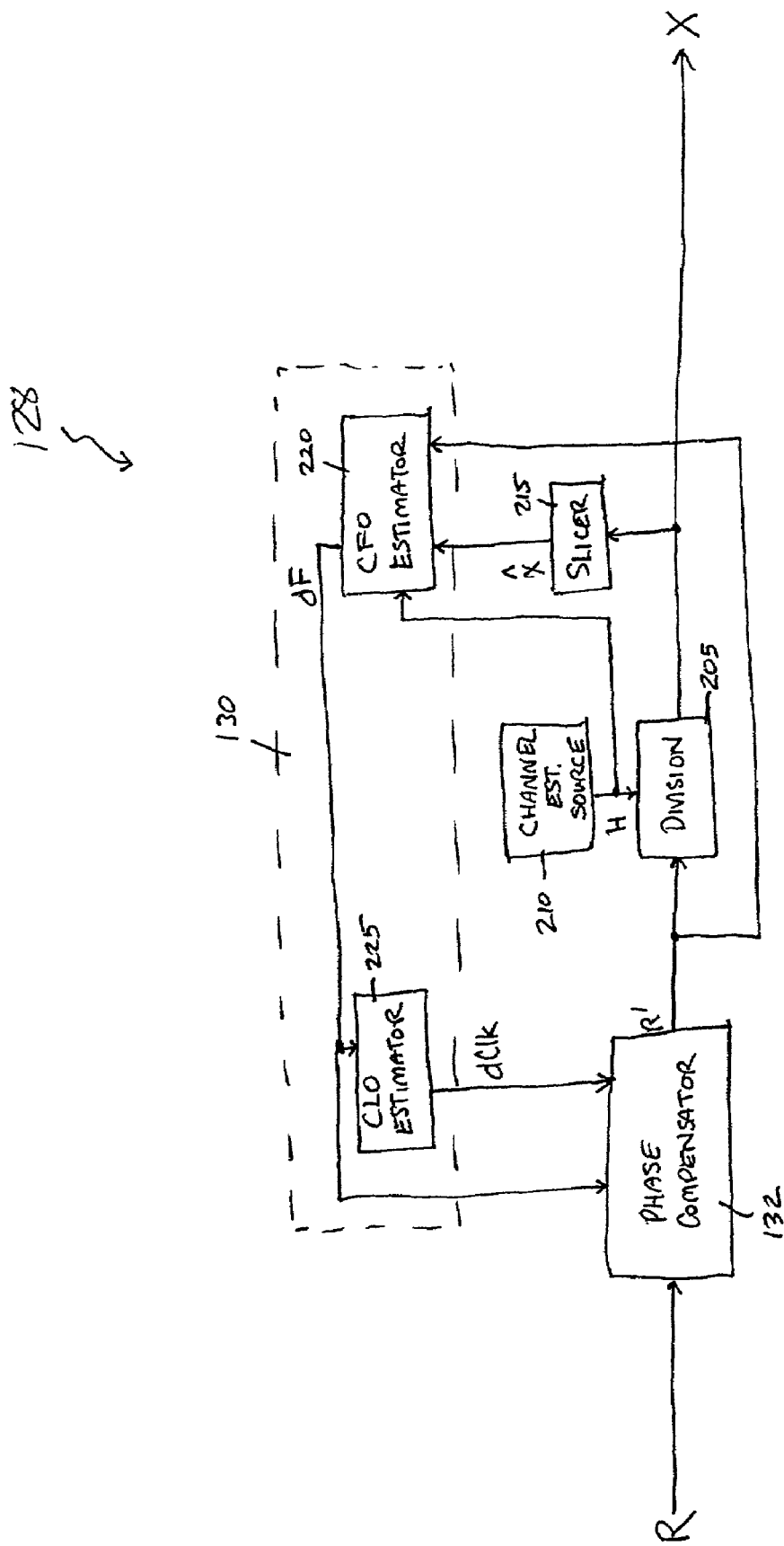
FIG. 2 is a block diagram of an equalizer for an OFDM system according to the present invention.

FIG. 2 is a functional block diagram of an equalizer 128 according to an exemplary embodiment of the present invention. Equalizer 128 receives a signal R, which typically comprises a plurality of complex numbers, where each complex number represents a sample of the signal in one of the carriers of the multi-carrier signal. Equalizer 128 performs phase compensation and channel equalization on received signal R, outputting an equalized signal X.

Equalizer 128 provides phase compensation via a feedback loop. The received signal R is input to phase compensator 132, which adjusts the phase of received signal R by multiplying it by $\exp(j2\pi\phi)$, where $\phi$ is an estimate of the total phase offset, including both carrier and clock frequency offsets. Phase compensator 132 produces a phase-compensated signal R'. Phase-compensated signals R' are provided to phase estimator 130, which uses the signals R' together with other data to generate a carrier frequency offset (CFO) estimate (dF) and a clock frequency offset (CLO) estimate (dClk). These estimates are in turn used by phase compensator 132 to compute total phase offset φ for compensating subsequent signals.

Phase-compensated signal R' is also provided to a division block 205, which performs compensation for the channel transfer function by dividing the phase-compensated signal R' by channel estimates (H) provided by a channel estimate source 210. Channel estimate source 210 may comprise a memory for storing channel estimates received from channel estimator 122 of FIG. 1. Alternatively, in embodiments where channel estimation is performed in the frequency domain, channel estimate source 210 may be configured to compute the channel estimates. Other implementations and variations are also possible. Division block 205 provides an equalized signal (X) as an output for subsequent processing.

Phase estimator 130 receives phase-compensated signal R', equalized signal X, and channel estimates H as inputs, and provides phase offset estimates dF and dClk to compensate phase block 132. Phase estimator 130 also receives a sliced signal ($\hat{X}$), which is derived from equalized signal X by slicer 215, which applies a hard threshold cutoff. Phase estimator 130 comprises CFO estimator 220 and CLO estimator 225, which will now be described in more detail.

Figure 3:
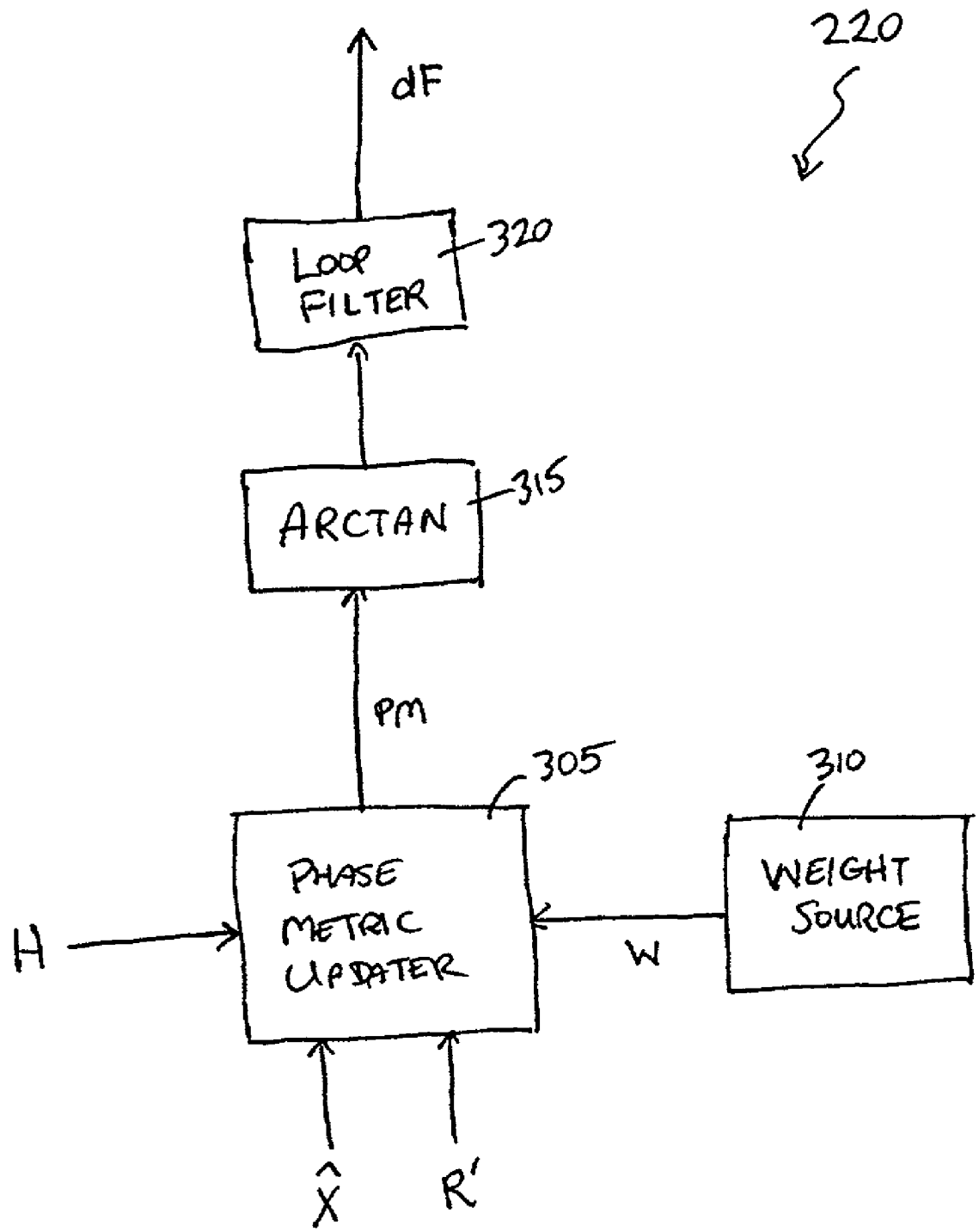
FIG. 3 is a block diagram of a carrier frequency offset estimator according to an embodiment of the present invention.

FIG. 3 shows a block diagram of an exemplary embodiment of CFO estimator 220. Phase-compensated signal R', sliced signal $\hat{X}$, and channel estimates H are provided as inputs to phase metric updater 305. Typically, each of these inputs comprises a plurality of complex numbers corresponding to different carriers k in the multi-carrier system. Phase metric updater 305 also receives a carrier-dependent weight $w_k$ for each carrier k from weight source 310. The carrier-dependent weights $w_k$ are real numbers. The value of $w_k$ for each carrier is selected to improve CFO estimates in the presence of non-white noise by giving greater weight to carriers where less noise is present. The operation of weight source 310 and exemplary methods of selecting the values of the weights $w_k$ will be discussed in detail below.

For each carrier k, phase metric updater 305 computes a carrier phase metric component ($C_k$). In general, the phase difference between a phase-compensated sample $R_k'$ and a corresponding sliced sample $\hat{X}_k$ may be obtained by multiplying $R_k'$ by the complex conjugate of $\hat{X}_k$ (denoted $\hat{X}_k^*$). An improved estimate of the phase offset may be obtained if phase-compensated sample $R_k'$ is first multiplied by the complex conjugate of the corresponding channel estimate $H_k$ (denoted $H_k^*$). This reduces any phase change introduced by the channel while giving greater weight to carriers in which the channel transfer function is large, i.e., where the signal is strongest. Thus, carrier phase metric component $C_k$ is given by:

$$C_k = H_k^* \hat{X}_k^* R_k'.$$

Carrier phase metric components $C_k$ are computed for each carrier k.

A phase metric (PM) is then computed by forming a weighted sum of carrier phase metric components $C_k$, where each $C_k$ is weighted by the corresponding carrier dependent weight $w_k$:

$$PM = \sum_{k=carriers} w_k H_k^* \hat{X}_k^* R_k'.$$

Phase metric updater 305 provides phase metric PM as a complex number to arctan block 315. Arctan block 315 computes and outputs the phase of phase metric PM, using the well-known property that for any complex number Z, the phase of Z is given by arctan(Im Z/Re Z), where Im Z is the imaginary part of Z and Re Z is the real part of Z.

Arctan block 315 is followed by a loop filter 320, which combines current and previously computed phase values to determine the CFO estimate dF. In one embodiment, loop filter 320 is advantageously implemented as an infinite impulse response filter, in which all previously received phase values are used, but the weight given to each value decreases with the time since receipt. Such filters are well known in the art, and it will be appreciated that an infinite impulse response filter provides stability in the feedback loop without unnecessarily compromising the responsiveness of the CFO estimate dF. However, other loop filters, such as time averaging over a fixed number of symbol periods, may also be employed.

Exemplary techniques for selecting values for the carrier-dependent weights $w_k$ will now be described. As stated above, for each carrier k, weight source 310 provides a carrier-dependent weight $w_k$ to be used in computing phase metric PM. The values of the carrier-dependent weights are controlled to account for the effect of frequency-dependent noise in the system, so that those carrier frequencies that are subject to greater noise are given relatively less weight in determining phase metric PM, while carrier frequencies subject to less noise are given relatively greater weight. Preferably, a noise power spectrum is estimated for the carriers k, and the values of weights $w_k$ are selected to be inversely proportional to the noise power spectrum. Other relationships between noise power and weight may also be used. Although the carrier-dependent weights $w_k$ may be selected to be normalized (e.g., by requiring $\Sigma w_k = 1$), it will be appreciated that this is not necessary because only the phase, not the amplitude, of phase metric PM is of interest.

Numerous techniques for estimating a noise power spectrum are known in the art, and any such technique may be employed in weight source 310. For instance, in embodiments where the frequency-dependent noise is dominated by noise within the receiver electronics, the noise power spectrum may be measured off-chip and values for carrier-dependent weights $w_k$ programmed into weight source 310.

Figure 4:
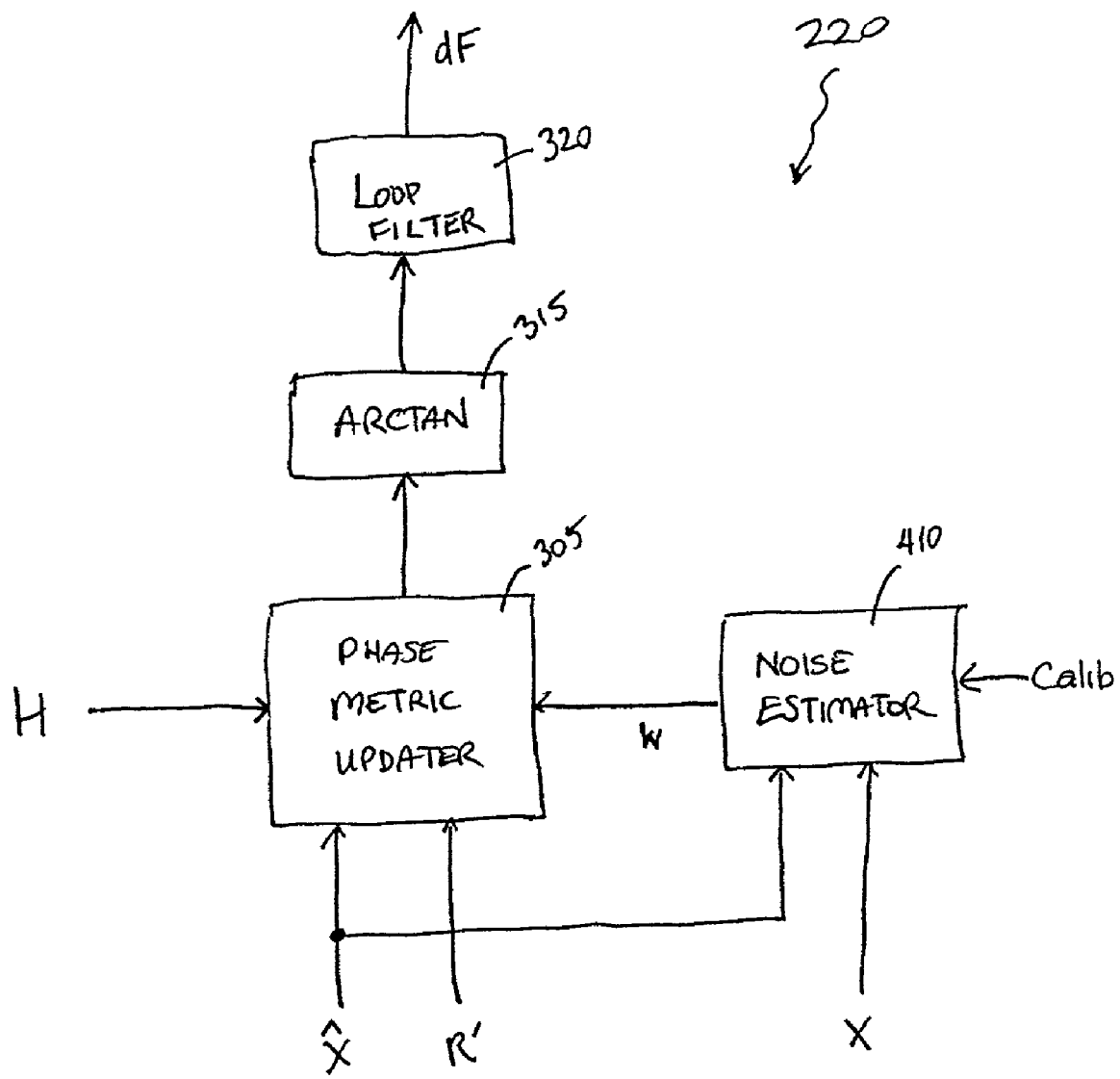
FIG. 4 is a block diagram an of alternative embodiment of a carrier frequency offset estimator according to the present invention.

In other embodiments, carrier-dependent weights $w_k$ may be measured in real time from the data itself. For example, FIG. 4 shows a noise estimator 410 that provides weights $w_k$ to phase metric updater 305. Noise estimator 410 receives as inputs the sliced signal $\hat{X}$ and the (unsliced) equalized signal X. Sliced signal $\hat{X}$ differs from equalized signal X by the application of a threshold cutoff intended to eliminate noise so that comparing sliced signal $\hat{X}$ and equalized signal X for a particular carrier provides an estimate of the noise for that carrier. From the resulting estimated noise power spectrum, carrier-dependent weights $w_k$ may be computed in a straightforward manner, e.g., by making each weight $w_k$ the inverse of the noise power for the carrier k.

Noise estimator 410 may also be configured to generate weights during a calibration event when no data is being transmitted over channel 114 of FIG. 1. In this embodiment, the receiver of which equalizer 128 is a part is configured to provide a calibration signal (Calib) to its various components at selected times when no incoming data is detected, causing the components to process a calibration event; the receiver may also be configured to provide known calibration data for processing during the calibration event. For any particular component, processing of a calibration event may be identical to regular data processing or may include additional calibration steps.

Accordingly, noise estimator 410 may be configured to receive the calibration signal Calib as shown in FIG. 4, in addition to equalized signal X and sliced signal X̂. During a calibration event—indicated by the presence of calibration signal Calib—noise estimator 410 compares equalized signal X and sliced signal X̂ to the (known) calibration data and computes an estimate of the noise power spectrum using well-known calibration techniques. Again, the estimated noise power spectrum is then used to compute carrier-dependent weights $w_k$.

In addition, in some implementations of OFDM, a subset of the carriers transmit a known sequence of symbols to be used by the receiver for computing channel estimates and for other purposes. These "pilot" carriers provide reliable estimates of phase offset because the transmitted signal in each pilot carrier is known. Thus, weight source 310 or noise estimator 410 may be configured to increase the carrier-dependent weights $w_k$ for the pilot carriers relative to other carriers. This feature may be implemented in combination with any of the above or other methods of estimating a noise power spectrum.

As another example, in some implementations of OFDM, some of the carriers provide more reliable channel estimates than others, and the reliability of the channel estimate for each carrier is known in advance. For example, the channel estimation system and method disclosed in the above-cross-referenced U.S. patent application Ser. No. 09/966,419 provides a channel estimate that has a known reliability distribution for the carriers. Reliability may be measured, e.g., by relative uncertainty in the channel estimate, by absolute uncertainty in the channel estimate, or by other standard measures. In such implementations, weight source 310 or noise estimator 410 may be configured to increase or decrease the carrier-dependent weight $w_k$ as a function of the known reliability of the channel estimate for the carrier, thereby giving greater relative weight to carriers with more reliable channel estimates. This feature may also be implemented in combination with any of the above or other methods of estimating a noise power spectrum.

It will be appreciated that the foregoing examples of a weight source do not exhaust the possibilities for estimating a noise power spectrum and computing weights. Indeed, any noise estimation technique that provides an estimate of a noise power spectrum may be used.

Returning to FIG. 2, the CFO estimate dF computed by CFO estimator 220 is provided as an input to CLO estimator 225. CLO estimator 225 computes a clock frequency offset (CLO) estimate dClk from the CFO estimate dF by relying on a known relationship between the clock and carrier frequency offsets. For instance, according to some standards for OFDM (e.g., the 802.11a standard), the carrier frequency and the clock frequency are required to be derived from the same oscillator. Where this is the case, the clock frequency offset is proportional to the carrier frequency offset divided by the carrier frequency. The applicability of CLO estimator 225 is not limited to any particular standard, but can be used in any case where a direct relationship between the clock frequency offset and the carrier frequency offset obtains.

CLO estimate dClk represents the difference between the sampling clock rates in the transmitter and the receiver. As described above, this difference may lead to errors if the receiver incorrectly identifies the beginning of a symbol. In some embodiments, CLO estimator 225 may be used to provide improved synchronization, as will now be described.

Figure 5:
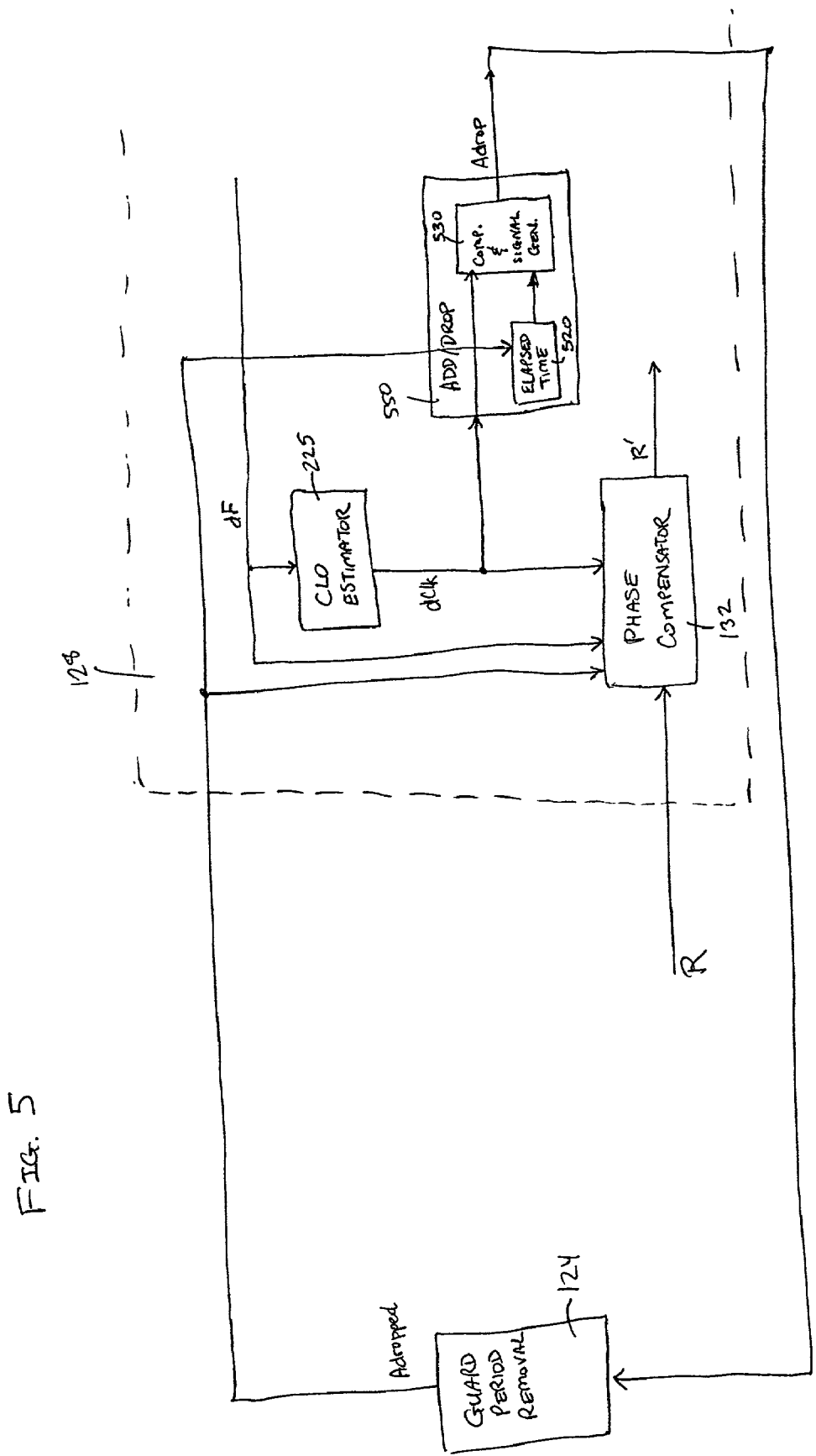
FIG. 5 is a block diagram of an exemplary implementation of an add/drop signal generator according to the present invention.

FIG. 5 shows an embodiment in which CLO estimator 225 provides CLO estimate dClk to an Add/Drop module 550 as well as to phase compensator 132. Add/Drop module 550 stores and updates an elapsed time in block 520. In block 530, the product of the elapsed time and the clock offset estimate dClk is computed and compared to each of two thresholds. When the product of the elapsed time and the received clock offset estimate dClk exceeds a first threshold, block 530 generates a "drop" instruction, which is sent via an Adrop signal path to guard period removal block 124. The drop instruction causes block 124 to drop one sample in order to restore synchronization. When the product of the elapsed time and the received clock offset estimate dClk falls below a second threshold, which may be equal to the first threshold but may not exceed it, block 530 generates an "add" instruction, which is sent via the Adrop signal path to guard period removal block 124. The add instruction causes block 124 to add one sample in order to restore synchronization.

A signal Adropped is sent to equalizer 128 by guard period removal block 124 when it has added or dropped a signal either in response to a received add or drop command or on the basis of its internal synchronization algorithms (a number of which are known in the art). The signal Adropped is received by phase compensator 132, which then shifts the phase by one sample; the shift may be either up or down, depending on whether signal Adropped indicates an add or a drop. Signal Adropped is also provided to Add/Drop module 550, causing a reset of the elapsed time.

In many implementations, it is advantageous to perform a preliminary estimation of and compensation for CFO in the time domain, for instance via preliminary CFO block 120 of FIG. 1. For example, CFO may be estimated by relying on the periodicity of a known training sequence embedded in the data. The estimate may be made either directly in the time domain or in the frequency domain. In the latter case, the estimate may be improved by relying on the known spectral content to improve the estimate. For instance, the training data may include "zero carriers," i.e., carriers that always transmit zeroes. At the receiver end, spurious signals may appear on the zero carriers due to noise in the channel or the receiver electronics; a CFO estimate that filters out these spurious signals may be readily computed. Other methods of making preliminary CFO estimates may also be used.

In such an implementation, there may remain a residual CFO that is not removed by the time-domain estimation. For instance, a typical time-domain estimation algorithm cannot adequately deal with phase offsets in the presence of non-white noise (i.e., a noise power spectrum that depends on carrier frequency). In addition, preliminary CFO block 120 generally does not estimate or compensate for clock offset.

Figure 6:
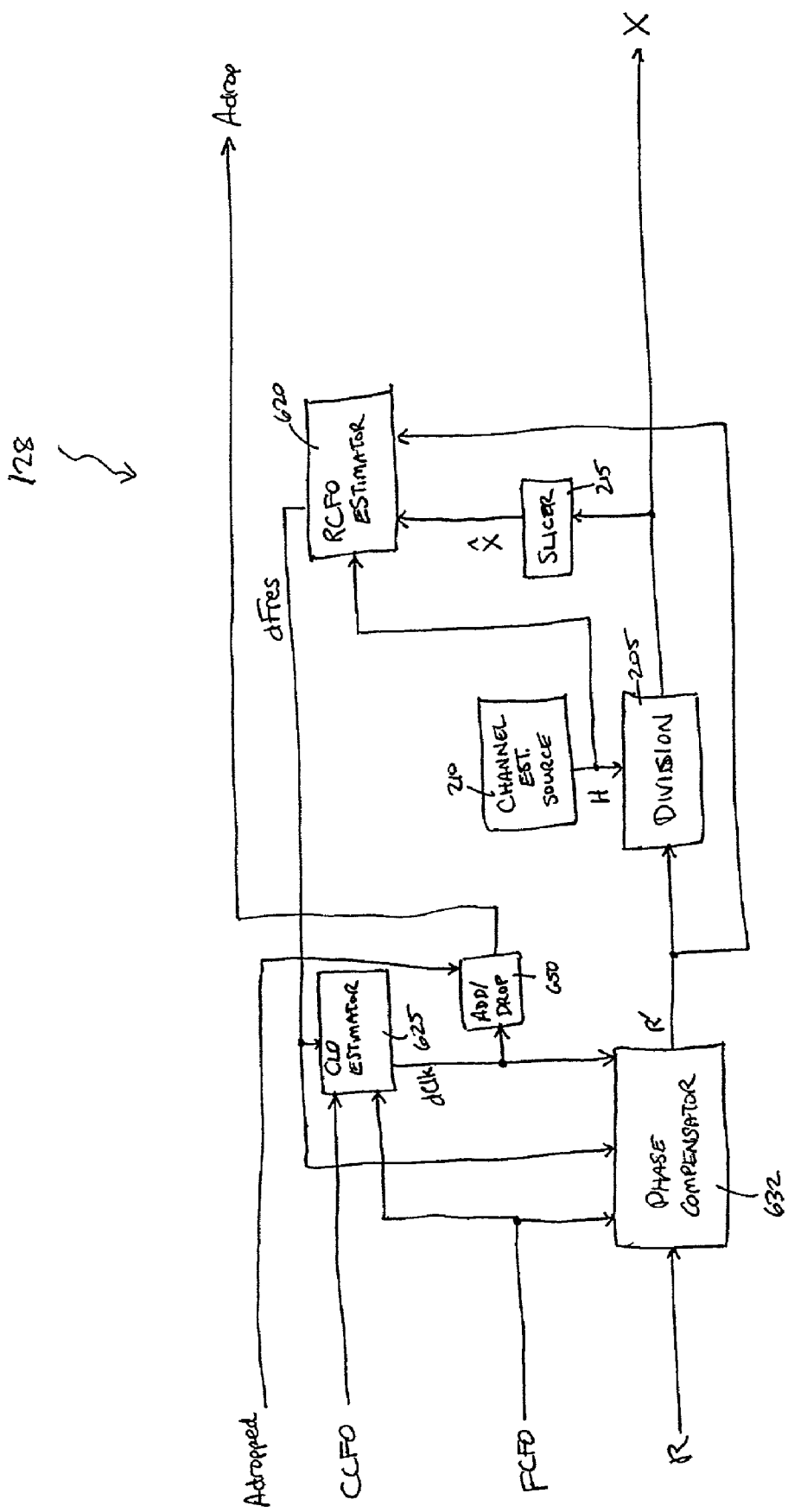
FIG. 6 is a block diagram of an alternative embodiment of an equalizer according to the present invention.

The phase offset estimation procedures described above are equally useful in such implementations. For example, FIG. 6 illustrates an embodiment of an equalizer block 128 for use in an implementation that provides a preliminary estimate of CFO. In this implementation, the preliminary CFO estimate comprises a coarse CFO estimate (CCFO) and a fine CFO estimate (FCFO). CCFO is computed from training data embedded in the data stream at the transmitter end. The training data includes short periodic training symbols; comparing the received signals to the known periodic symbols provides a fast estimate of CFO over a wide range of offset values (e.g., up to 250 kHz), but the accuracy of the estimate is limited. FCFO is computed from other data in the data stream, such as longer periodic training symbols. Use of longer symbols improves the accuracy of the estimate but limits the range of the estimate to smaller offset values (e.g., up to 50 kHz) and requires more processing time. Thus, CCFO is computed and compensated for prior to channel estimation so that the residual CFO is sufficiently reduced to provide reliable channel estimates. FCFO is computed in parallel to channel estimation in order to reduce latency.

FCFO is provided as an input to phase compensator 632 and to CLO estimator 625. CCFO is provided as an input to CLO estimator 625. CLO estimator 625 is similar to previously described CLO estimator 225, except that the CFO estimate used is the sum of CCFO, FCFO and a residual CFO estimate dFres provided by residual CFO estimator 620. The operation of residual CFO estimator 620 is essentially the same as described above with regard to FIG. 3, but because the received signal R has already been compensated for CCFO and FCFO (in preliminary CFO block 120), what is computed is a residual CFO estimate dFres. Phase compensator 632 operates similarly to phase compensator 132 described above, except that the phase estimate φ may include CCFO and FCFO, as well as dFres and dClk.

The preliminary carrier frequency offset estimates CCFO and FCFO may also be used during system initialization. For example, in the embodiment of FIG. 6, because dFres is an output of a feedback loop; during the earliest received symbols, dFres may be either absent or unreliable. To perform phase compensation during this time, FCFO may be supplied to phase compensator 632. For instance, for the first few (e.g., two) symbols, phase compensator 632 may be configured to use FCFO instead of dFres and thereafter to switch to dFres.

The present invention thus provides various methods and systems that efficiently implement broadband multi-carrier communication systems. Estimation of carrier frequency offset according to the present invention results in reduced error in the presence of non-white noise. In addition, the present invention provides improved synchronization by using an estimate of clock frequency offset derived from the carrier frequency offset estimate.

While a detailed description of exemplary embodiments of the invention has been presented, it will be appreciated that various alternatives, modifications, and equivalents are possible. For instance, weight source 310 may be implemented using any noise estimation technique, and its inputs and outputs may be varied accordingly. It is further to be understood that any of the functional blocks in equalizer 128 may be implemented by a combination of hardware and/or software, and that in specific implementations some or all of the functionality of some of the blocks may be combined. Also, while the techniques described herein are particularly well suited for wireless communication systems using OFDM, similar advantages can be realized when applying the same to wireline systems, and in general any system requiring compensation for phase errors induced by carrier frequency offsets. The scope of the present invention is thus not limited to the specific embodiments described, and is instead defined by the following claims and their full breadth of equivalents.

What is claimed is:

1. In a multi-carrier data communication system, a method of estimating a carrier frequency offset for a received signal, the method comprising:
   associating each of a plurality of carrier-specific weighting factors with a different one of a plurality of carriers of the multi-carrier data;
   assigning a value to each of the plurality of carrier-specific weighting factors, wherein the step of assigning the value to each of the plurality of carrier-specific weighting factors comprises:
      measuring a noise power spectrum across the plurality of carriers;
      selecting a value inversely proportional to the noise power for one of the plurality of carriers; and
      assigning the selected value to the associated carrier-specific weighting factor; and
   computing a carrier frequency offset estimate using the received signal, an estimate of a channel transfer function associated with the received signal, and the plurality of carrier-specific weighting factors.

2. The method of claim 1, wherein:
   the plurality of carriers includes a first subset of pilot carriers and a second subset of non-pilot carriers; and
   the step of assigning a value to each of the plurality of carrier-specific weighting factors comprises increasing a first carrier-specific weighting factor associated with one of the pilot carriers relative to a second carrier-specific weighting factor associated with one of the non-pilot carriers.

3. In a multi-carrier data communication system, a method of estimating a carrier frequency offset for a received signal, the method comprising:
   associating each of a plurality of carrier-specific weighting factors with a different one of a plurality of carriers of the multi-carrier data;
   assigning a value to each of the plurality of carrier-specific weighting factors, the value being inversely related to a noise power associated with the associated carrier; and
   computing a carrier frequency offset estimate, wherein the step of computing the carrier frequency offset estimate comprises:
      phase-compensating the received signal using a previous carrier frequency offset estimate;
      equalizing the phase-compensated signal using an estimate of the channel transfer function;
      computing a phase metric from the phase-compensated signal, the equalized signal, the estimate of the channel transfer function, and the plurality of carrier-specific weighting factors;
      computing a phase of the phase metric; and
      applying a loop filter to the computed phase.

4. The method of claim 3, wherein the step of computing the phase metric comprises:
   applying a threshold cutoff to the equalized signal, thereby producing a sliced signal;
   multiplying the phase-compensated signal for each of the plurality of carriers by the complex conjugate of the sliced signal for the carrier and by the complex conjugate of the channel estimate for the carrier, thereby obtaining a first product;
   multiplying the first product by the carrier-specific weight associated with the carrier, thereby obtaining a weighted product; and
   summing the weighted product over the plurality of carriers, thereby obtaining the phase metric.

5. The method of claim 1, further comprising: using the carrier frequency offset estimate to phase-compensate a subsequent received signal.

6. A method for processing a multi-carrier signal transmitted across a channel, comprising:
assigning a value to each of a plurality of carrier-specific weighting factors, each of the plurality of carrier-specific weighting factors being associated with a different one of a plurality of carriers of the multi-carrier signal, the assigned value of each carrier-specific weighting factor being inversely related to a noise power associated with the carrier;
receiving the multi-carrier signal;
phase compensating the multi-carrier signal using a phase compensation factor;
equalizing the phase-compensated signal using a channel estimate;
estimating a carrier frequency offset using the phase-compensated signal, the equalized signal, the channel estimate, and the plurality of carrier-specific weighting factors;
estimating a clock frequency offset using the estimated carrier frequency offset; and
updating the phase compensation factor using the estimated carrier frequency offset and the estimated clock frequency offset.

7. The method of claim 6, wherein the step of assigning a value to each of the plurality of carrier-specific weighting factors comprises:
measuring a noise power spectrum across the plurality of carriers;
selecting a value inversely proportional to the noise power for one of the plurality of carriers; and
assigning the selected value to the associated carrier-specific weighting factor.

8. The method of claim 6, wherein:
the plurality of carriers includes a first subset of pilot carriers and a second subset of non-pilot carriers; and
the step of establishing a plurality of carrier-specific weighting factors comprises increasing a first carrier-specific weighting factor associated with one of the pilot carriers relative to a second carrier-specific weighting factor associated with one of the non-pilot carriers.

9. The method of claim 6, wherein:
the plurality of carriers includes a first carrier and a second carrier, a first channel estimate associated with the first carrier having a higher reliability than a second channel estimate associated with the second carrier; and
the step of establishing a plurality of carrier-specific weighting factors comprises increasing a first carrier-specific weighting factor associated with the first carrier relative to a second carrier-specific weighting factor associated with the second carrier.

10. The method of claim 6, wherein the step of estimating the carrier frequency offset comprises:
computing a phase metric from the phase-compensated signal, the equalized signal, the channel estimate, and the plurality of carrier-specific weighting factors;
computing a phase of the phase metric; and
applying a loop filter to the computed phase.

11. The method of claim 10, wherein the step of computing the phase metric comprises:
applying a threshold cutoff to the equalized signal, thereby producing a sliced signal;
multiplying the phase-compensated signal for each of the plurality of carriers by the complex conjugate of the sliced signal for the carrier and by the complex conjugate of the channel estimate for the carrier, thereby obtaining a first product;
multiplying the first product by the carrier-specific weight associated with the carrier, thereby obtaining a weighted product; and
summing the weighted product over the plurality of carriers, thereby obtaining the phase metric.

12. The method of claim 11, wherein the loop filter comprises an infinite impulse response filter.

13. The method of claim 6, wherein the step of estimating a clock frequency offset comprises multiplying the estimated carrier frequency offset by a factor inversely proportional to a carrier frequency.

14. The method of claim 13, further comprising:
computing a net time offset based on the clock frequency offset estimate and an elapsed time;
generating a drop instruction when the net time offset exceeds a drop threshold, the drop instruction causing a portion of the multi-carrier signal to be dropped from a symbol;
generating an add instruction when the net time offset is below an add threshold, the add instruction causing a portion of the multi-carrier signal to be added to the symbol; and
resetting the elapsed time after the portion of the multi-carrier signal has been added to or dropped from the symbol.

15. The method of claim 6, further comprising:
determining a coarse carrier frequency offset;
determining a fine carrier frequency offset; and
updating the phase compensation factor using the coarse carrier frequency offset and the fine carrier frequency offset.

16. In a multi-carrier data communication system, a method of equalizing a multi-carrier signal, the method comprising:
estimating a channel transfer function;
compensating a received signal using a phase compensation factor, yielding a phase-compensated signal;
compensating the phase-compensated signal using the estimated channel transfer function, yielding an equalized signal;
estimating a phase metric using the phase-compensated signal, the equalized signal, the estimated channel transfer function, and a plurality of carrier-specific weighting factors, wherein each of the carrier-specific weighting factors being associated with a different one of a plurality of carriers of the multi-carrier signal and assigned a value inversely related to a noise power associated with the carrier;
estimating a carrier frequency offset using the estimated phase metric;
estimating a clock frequency offset using the updated estimate of the carrier frequency offset; and
updating the phase compensation factor using the estimated carrier frequency offset and the estimated clock frequency offset.

17. The method of claim 16, wherein the value of each of the carrier-specific weighting factors is inversely proportional to a noise power associated with the associated carrier.

18. The method of claim 17, wherein:
the plurality of carriers comprises a first subset of pilot carriers and a second subset of non-pilot carriers; and the carrier-specific weighting factor associated with at least one of the pilot carriers is increased relative to the carrier-specific weighting factor associated with at least one of the non-pilot carriers.

19. The method of claim 17, wherein:
the plurality of carriers includes a first carrier and a second carrier, a first channel estimate associated with the first carrier having a higher reliability than a second channel estimate associated with the second carrier; and
the carrier-specific weighting factor associated with the first carrier is increased relative to the carrier-specific weighting factor associated with the second carrier.

20. The method of claim 16, wherein the step of estimating the phase metric comprises:
applying a threshold cutoff to the equalized signal, thereby producing a sliced signal;
multiplying the phase-compensated signal for each carrier by a complex conjugate of the sliced signal for the carrier and by a complex conjugate of the estimated channel transfer function for the carrier, thereby obtaining a product;
multiplying the product by the carrier-specific weight associated with the carrier, thereby obtaining a weighted product; and
summing the weighted product over the plurality of carriers, thereby obtaining the phase metric.

21. The method of claim 16, wherein the step of estimating the clock frequency offset comprises multiplying the estimated carrier frequency offset by a factor inversely proportional to the carrier frequency.

22. The method of claim 21, further comprising:
computing a net time offset based on the clock frequency offset estimate and an elapsed time;
generating a drop instruction when the net time offset exceeds a drop threshold, the drop instruction causing a portion of the multi-carrier signal to be dropped from a symbol;
generating an add instruction when the net time offset is below an add threshold, the add instruction causing a portion of the multi-carrier signal to be added to the symbol; and
resetting the elapsed time after the portion of the multi-carrier signal has been added to or dropped from the symbol.

23. The method of claim 16, wherein the step of estimating the carrier frequency offset comprises:
computing the phase metric from the phase-compensated signal, the equalized signal, the estimated channel transfer function, and the plurality of carrier-specific weighting factors;
computing a phase of the phase metric; and
applying a loop filter to the computed phase.

24. In a receiver for a multi-carrier data communication system, an equalizer comprising:
a phase compensator configured to receive an input signal, a carrier frequency phase offset estimate, and a clock frequency phase offset estimate, and to output a phase-compensated signal;
a channel equalization block configured to receive a plurality of channel estimates and the phase-compensated signal, and to output an equalized data signal;
a carrier frequency offset estimator configured to receive the plurality of channel estimates, the phase-compensated signal, and the equalized data signal, and to compute and output the carrier frequency phase offset estimate using a plurality of carrier-specific weighting factors, wherein each of the carrier-specific weighting factors being associated with a different one of a plurality of carriers of the multi-carrier data and having a value inversely related to a noise power associated with the associated carrier; and
a clock frequency offset estimator configured to receive the carrier frequency phase offset estimate and compute the clock frequency phase offset estimate.

25. The equalizer of claim 24, wherein the carrier frequency offset estimator comprises:
a weight source configured to output the plurality of carrier-specific weighting factors; a slicer configured to receive the equalized data signal and to output a sliced signal;
a phase metric updater configured to receive the plurality of channel estimates, the phase-compensated signal, the sliced signal, and the plurality of carrier-specific weighting factors, and to compute and output a phase metric;
a phase computation unit coupled to the phase metric updater and configured to compute and output a phase of the phase metric; and
a loop filter coupled to the phase computation unit and configured to store a plurality of values of the phase and to compute the carrier frequency phase offset estimate.

26. The equalizer of claim 25, wherein the weight source comprises a noise estimator configured to measure a noise power spectrum.

27. A multi-carrier data communication system comprising:
a transmitter including:
a modulator/deserializer configured to convert an input data stream into a parallel plurality of multi-carrier signals;
a frequency-domain to time-domain converter having an input coupled to the modulator/deserializer and configured to transform the parallel plurality of multi-carrier signals from frequency domain into time domain at an output;
a guard period insertion block coupled to the frequency-domain to time-domain converter and configured to insert a guard period in the output of the frequency-domain to time-domain converter;
a serializer coupled to an output of the guard period insertion block and configured to perform a parallel to serial conversion on the signal; and
a digital-to-analog converter coupled to the serializer and configured to convert a digital signal into an analog signal and to transmit the analog multi-carrier time domain signal across a channel; and
a receiver including:
an analog-to-digital converter coupled to receive the analog signal and configured to convert the analog signal into a second digital signal;
a deserializer coupled to the analog-to-digital converter and configured to convert the second digital signal into a second parallel plurality of multi-carrier signals;
a channel estimator coupled to an output of the deserializer and configured to compute a plurality of channel estimates;
a guard period removal block coupled to an output of the channel estimator and configured to remove the guard period;
a time-domain to frequency-domain converter coupled to an output of the guard period removal block;

an equalizer coupled to an output of the time-domain to frequency-domain converter, configured to equalize the second parallel plurality of multi-carrier signals using the plurality of channel estimates and further configured to compensate for a carrier frequency offset and a clock frequency offset using a carrier frequency offset estimate that includes a plurality of carrier-specific weighting factors, wherein each of the carrier-specific weighting factors is associated with a different one of a plurality of carriers of the second parallel plurality of multi-carrier signals and having a value related to a noise power associated with the associated carrier; and a serializer/demodulator coupled to the output of the equalizer and configured to generate an output data stream.

28. The multi-carrier data communication system of claim 27, further comprising:

a preliminary carrier frequency offset estimation block coupled between the deserializer and the guard period removal block, wherein the preliminary carrier frequency offset estimation block is configured to output a preliminary estimate of carrier frequency offset.

29. The multi-carrier data communication system of claim 28, wherein the equalizer is configured to receive the preliminary estimate of carrier frequency offset for use in compensating for the carrier frequency offset.

* * * * *